United States Patent [19]
Yoshioka

[11] Patent Number: 5,157,514
[45] Date of Patent: Oct. 20, 1992

[54] DATA COMMUNICATION APPARATUS

[75] Inventor: Kazuhiko Yoshioka, Tokyo, Japan

[73] Assignee: Canon Kabushiki Kaisha, Tokyo, Japan

[21] Appl. No.: 562,684

[22] Filed: Aug. 6, 1990

[30] Foreign Application Priority Data

Aug. 9, 1989 [JP] Japan .................................. 1-204738

[51] Int. Cl.⁵ ............................................... H04N 100
[52] U.S. Cl. .................................... 358/407; 358/405; 379/100; 340/825.49
[58] Field of Search ............... 358/400, 401, 402, 403, 358/404, 405, 407, 434, 435, 436, 438, 439, 440, 442, 443, 445; 370/58, 56, 219; 340/825.18, 825.49; 379/57, 59, 220, 221, 258, 272, 94, 100

[56] References Cited
U.S. PATENT DOCUMENTS

| | | | |
|---|---|---|---|
| 4,785,355 | 11/1988 | Matsumoto | 358/434 |
| 4,862,281 | 8/1989 | Sato et al. | 358/400 |
| 4,868,860 | 9/1989 | Andros et al. | 379/57 |
| 4,942,599 | 7/1990 | Gordon et al. | 358/407 |
| 4,995,073 | 2/1991 | Okata et al. | 379/94 |

Primary Examiner—Edward L. Coles, Sr.
Assistant Examiner—Jerome Grant
Attorney, Agent, or Firm—Fitzpatrick, Cella, Harper & Scinto

[57] ABSTRACT

A data communication apparatus for receiving data from a relay requesting station and relay-transmitting the data to another partner includes a unit for discriminating the local area where the relay requesting station is installed, and a unit for forming a report data associated with relay-transmission results by using a language corresponding to the discrimination results by the discriminating unit and transmitting the report data to the relay requesting station.

11 Claims, 3 Drawing Sheets

DATA COMMUNICATION APPARATUS

BACKGROUND OF THE INVENTION

1. Field of the Invention

The present invention relates to a data communication apparatus, and more particularly to a data communication apparatus which receives data from a relay requesting station and transmits the received data to partners designated by the relay requesting station or to predetermined partners.

2. Related Background Art

As an apparatus of this type, there is known a facsimile apparatus which relays image data to another facsimile apparatus. The relay operation of a conventional facsimile apparatus is schematically shown in FIG. 3.

Referring to FIG. 3, symbol T represents a relay requesting station which executes a predetermined communication protocol and requests a relay station I (both are facsimile apparatus) to call desired multi-address partners. Image data to be relayed is transmitted at the same time to the relay station.

Sequentially in accordance with the control information received from the relay requesting station T, the relay station I transmits the image data to a plurality of relayed multi-address call partners (facsimile apparatus). The relay information to be transmitted is stored in an image memory.

A conventional facsimile apparatus at the relay station I further transmits a relay report to the relay requesting station T as illustrated at the right side of FIG. 3.

Specifically, the relay station I stores the communication results of the plurality of relayed multi-address call partners, and after all relay operations have been completed, edits the communication results as image data and sends it to the relay requesting station.

This relay report is drawn by developing character codes into image data by using a character generator or the like, and transmitted to the relay requesting station T using the similar communication protocol for ordinary image data.

A request for a relay can be executed so long as a facsimile apparatus can transmit data to the relay station. Such a relay request is made between facsimile apparatus not only within one country but also between different foreign countries.

The relay report to be transmitted to the relay requesting station after completion of relayed multi-address calls has been written in the language the relay station uses irrespective of the language the relay requesting station uses. For instance, most of facsimile apparatus used in Japan use the Japanese language in transmitting a relay report and other messages. Therefore, even if a relay is requested from a foreign country, a relay report written in the Japanese language is transmitted to the foreign country relay requesting station.

Relay transmission for transmitting received data to another partner is disclosed in U.S. Pat. No. 4,785,355 and U.S. Ser. Nos. 442,721 (filed on Nov. 29, 1989) and 451,185 (filed on Dec. 15, 1989). None of them has proposed any measure to solve such a problem.

SUMMARY OF THE INVENTION

In view of the above problem, the present invention aims at improving a data communication apparatus.

It is another object of the present invention to allow the apparatus to transmit a relay report which an operator at any relay requesting station can readily understand.

It is another object of the present invention to provide a data communication apparatus capable of drawing and transmitting a relay report written in a language used by the country of the relay requesting station.

The other objects of the present invention will become apparent from the following detailed description of the embodiment shown in the drawings.

DETAILED DESCRIPTION OF PREFERRED EMBODIMENTS

The embodiment of this invention will be described in detail with reference to the accompanying drawings. In the embodiment, a facsimile apparatus for image data communication is used as an example of a data communication apparatus.

Figure 1:
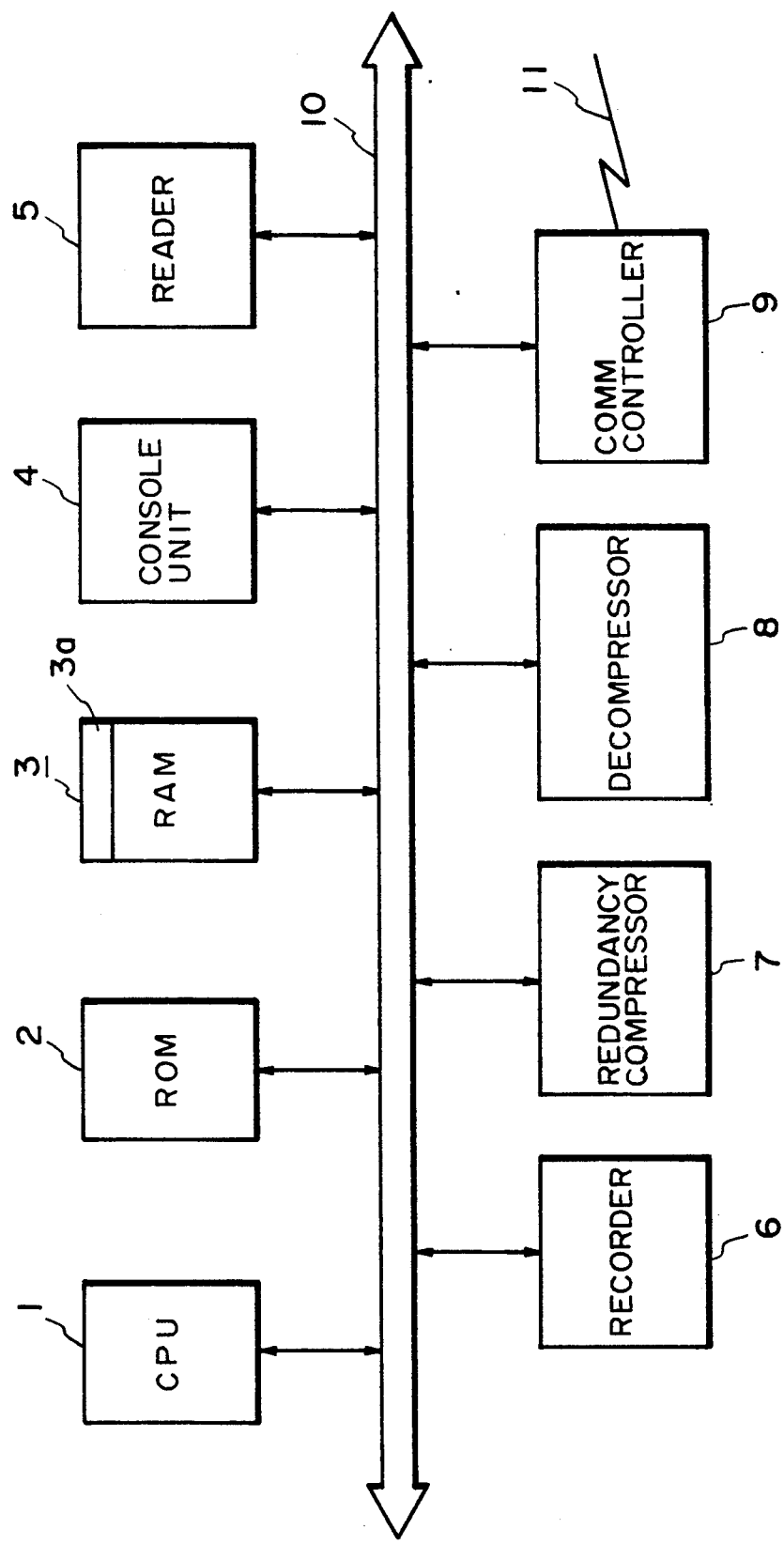
FIG. 1 is a block diagram showing the structure of a facsimile apparatus according to the embodiment.

FIG. 1 shows the structure of the facsimile apparatus embodying the invention.

Referring to FIG. 1, reference numeral 1 represents a CPU constructed of a microprocessor.

Connected to a system bus 10 made of an address bus and data bus of CPU 1 are the following devices which are controlled by CPU 1 for the execution of facsimile communication operation.

The system bus 10 is connected to a ROM 2, and a RAM 3 serving as working area. ROM 2 stores control programs executed by CPU 1, and RAM 3 is used as the working area for CPU 1.

In this embodiment, in order to transmit a relay report written in a language a relay requesting station uses, ROM 2 stores fixed messages written in various languages, the fixed messages being written by character codes and including the title, item name and the like of a relay report. ROM 2 stores font data of various languages so as to convert messages written by character codes into image data.

Also in this embodiment, RAM 3 has an area 3a stored in which are the telephone numbers of relayed multi-address call partners of various countries. If relay requests from overseas stations are to be received, the numbers (hereinafter called relay permissible dial numbers) of stations allowed to make relayed multi-address calls are stored in the area 3a. The relay permissible dial number is composed of an international identification code, country number and the like which are used when the relay requesting station is called. As will be described later, when a relay request is issued from a partner station, the relay permissible dial number is compared with a dial number received from a partner station in a protocol signal or the like, to thereby judge if the relay request can be allowed or not.

A console unit 4 is constructed of an LCD display and a keyboard having ten-keys, function keys and the like. The console unit 4 is used for the control of communication operation.

A reader 5 is constructed of a CCD line sensor, an original transporting system, and the like, and used for reading an original image.

A recorder 6 is constructed of a thermal recording head or laser baem recording mechanism, recording sheet transporting system, and the like, and is used for recording a received image or an image read with the reader 5 for copying it.

A redundancy compressor 7 is used mainly for suppressing the redundancy of an image signal to be transmitted. The compressor 7 performs coded compression of image signals into MH codes, MR codes or MMR codes.

A decompressor 8 is used for decompressing image signals (mainly received image signals) coded in accordance with the coding scheme of the redundancy compressor 7.

A communication controller 9 is constructed of a modem, NCU, call signal detecting unit, and the like and operates to interface between a line 11 such as a telephone network and the facsimile apparatus.

Figure 2:
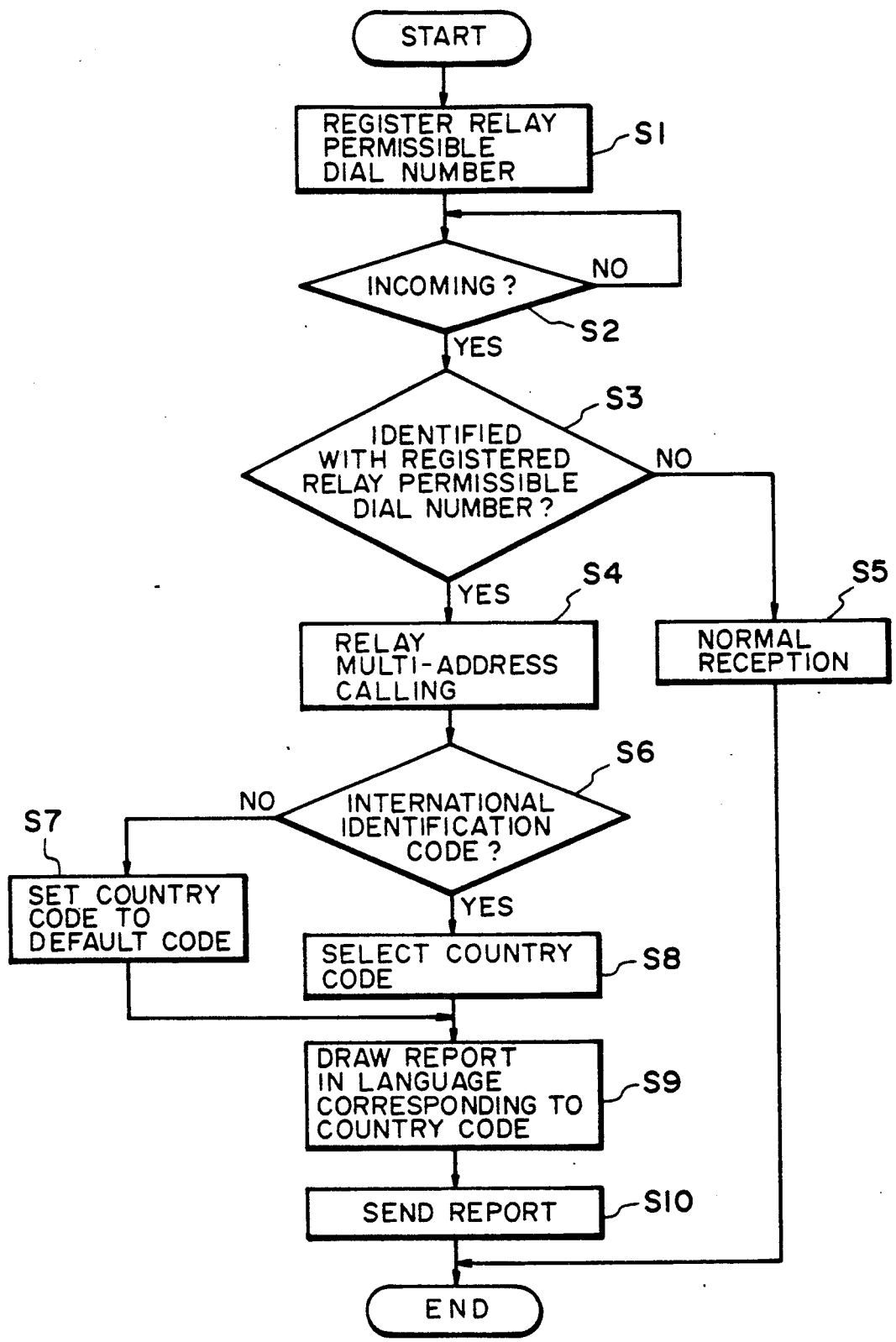
FIG. 2 is a flow chart illustrating the control operation by CPU 1 of the embodiment.
Figure 3:
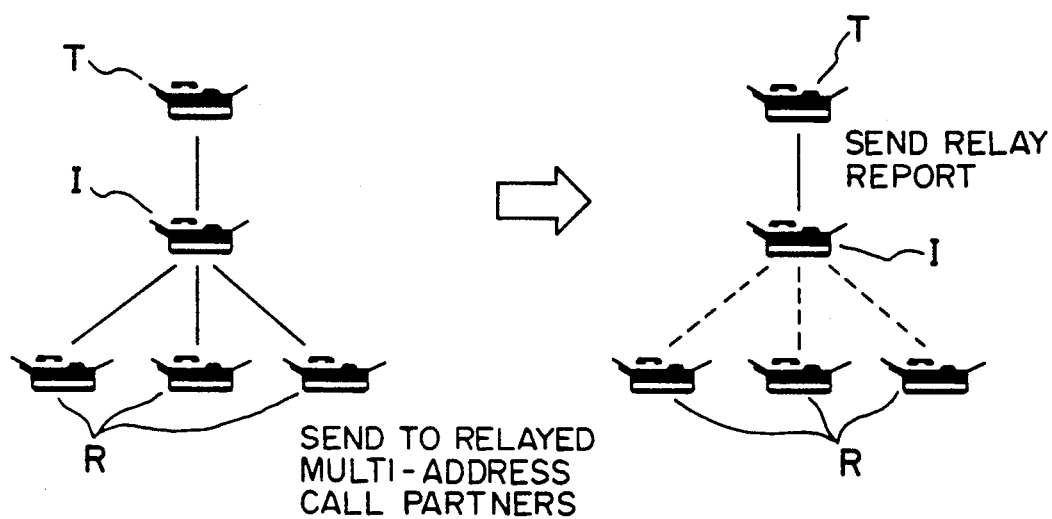
FIG. 3 is a schematic illustration of a relayed multi-address call scheme.

FIG. 2 shows the communication control procedure by CPU 1. The procedure shown in FIG. 2 is stored in ROM 2 as the control programs for CPU 1.

At step S1 shown in FIG. 2, a user registers relay permissible dial numbers. This registration is carried out by manipulating the console 4. In order that a relay station not be used by a number of unidentified partners, the telephone numbers of stations permitted to request a relay are previously registered. Such relay permissible dial numbers are stored in the area 3a of RAM 3. Editing the registered data is conducted by a user interface scheme using the display and keyboard of the console unit 4. A relay permissible dial number is registered by key inputs from the console unit 4. If a station permitted to request a relay is a foreign station, e.g., a USA station, the relay permissible dial number to be registered includes all digits required to call the station, namely, "0011 (country number of USA) xx (local number) . . . ". Such a relay permissible dial number can be used for calling the station in transmitting a relay report.

Next, at step S2, a call from the line is waited for. A call is detected by the communication controller 9. Upon reception of a call, the control advances to step S3.

It is checked at step S3 if there is a relay requesting signal (NSS signal in G3 protocol) from the partner. If there is a relay requesting signal, the telephone number transmitted by a predetermined protocol signal (TSI singal in G3 protocol) from the partner is compared with the relay permissible dial numbers registered at step S1. If there is an identical relay permissible dial number, the control advances to step S4. This comparison process may be made for all digits between the relay permissible dial number stored in the area 3a and the telephone number of the partner. However, since there is a possibility that the country number is not consistent in the case of international communications, the comparison process may be made for lower several digits. If there is no relay request from a partner, the control advances to step S5 whereat normal image reception is carried out.

At step S4, the telephone numbers and image data to be multi-address relayed are received and the image data are transmitted. In this case, the information of communications results of multi-address partners is sequentially stored in RAM 3. The telephone numbers of multi-address partners may be previously stored so that relayed multi-address calls can be automatically effected upon reception of a relay request.

If there is not an identical relay permissible dial number, the flow advances to step S5 whereat normal reception, that is, simple image data reception is carried out and the receive routine is ended.

It is checked at step S6 if there is included an international identification number within the relay permissible dial number stored in the area 3a coincident with the telephone number received from the relay requesting station. Assuming that the facsimile apparatus is installed in Japan, an international identification number (e.g., 001 for KDD) is included in the relay permissible dial number of the foreign partner station. The presence and absence of this international identification number is checked.

If the international identification number is included, the country number is picked up at step S8 from the relay permissible dial number of the relay requesting station stored in the area 3a. The relay permissible dial number is ordinarily included following the international identification number.

If the international identification number is not included in the telephone number at step S6, the control advances to step S7 whereat the country number is set to a default value. Assuming that the facsimile apparatus is installed in Japan, this default value is a code representative of Japan.

After steps S7 and S8, the control advances to step S9 whereat relay reports are made using a language corresponding to the country number determined at steps S7 and S8. Relay reports are made in accordance with the communication result information stored in RAM 3. In this case, fixed messages such as titles and item names of relay reports stored in ROM 2 are formed by using characters and words of the language corresponding to the country number.

For instance, for the country number of West Germany, the German language is used, whereas for the country number of USA, the English language is used. Fixed messages such as titles and item names of relay reports are stored in ROM 2 in the form of character codes or the like. In this case, the connotation format of the date may be changed in accordance with the country number.

The generated character information of the relay reports are developed into image data by using font data in ROM 2. At step S10 the relay reports formed at step S9 are transmitted in the form of image data to the relay requesting station. In calling the relay requesting station, the corresponding relay permissible dial number in the area 3a is used.

According to the above-described control, the telephone number of a relay requesting station is compared with previously registered relay permissible dial numbers, and if there is a relay permissible dial number identical to the relay requesting station telephone number, a relay is permitted, thereby preventing the facsimile apparatus from being used as a relaying station by a number of unidentified stationas.

Furthermore, in checking the telephone number, the international identification code is detected and then its country number is checked. Accordingly, the relay report can be made by using the language corresponding to the country number, and transmitted as image data to the relay requesting station. The relay requesting station can thus receive the relay report written in the language the station can read.

Identifying the country of the relay requesting station can be carried out not only with the telephone network but also with an ISDN by using an ISDN address or the like. It is obvious that the image communication protocol is not limited only to the facsimile protocol.

The present invention is applicable not only to facsimile apparatus but also to data communication apparatus having a data relay function such as telex and computer.

The present invention is not limited to the embodiment described above, but various modifications are possible.

I claim:

1. A data communication apparatus for receiving data from a relay requesting station and relay-transmitting the data to another partner, comprising:
    means for discriminating a local area where said relay requesting station is installed; and
    means for forming a report data associated with relay-transmission results by using a language corresponding to the discrimination results by said discriminating means, and transmitting said report data to said relay requesting station.

2. A data communication apparatus according to claim 1, wherein said discriminating means discriminates a country where said relay requesting station is installed.

3. A data communication apparatus according to claim 2, wherein said discriminating means discriminates a country in accordance with a telephone number of said relay discriminating station.

4. A data communication apparatus according to claim 1, wherein said report data transmitting means includes a memory for storing the information of a plurality of languages, selects a language in said memory in accordance with the discrimination results by said discriminating means and forms said report data in the selected language.

5. A data communication method for receiving data from a relay requesting station and relay-transmitting the data to another partner, comprising the steps of:
    discriminating the local area where said relay requesting station is installed; and
    forming a report data associated with relay-transmission results by using a language corresponding to the discrimination results by said discriminating means, and transmitting said report data to said relay requesting station.

6. A data communication method according to claim 5, wherein said discriminating step discriminates a country where said relay requesting station is installed.

7. A data communication method according to claim 6, wherein said discriminating step discriminates a country in accordance with a telephone number of said relay discriminating station.

8. A data communication method according to claim 5, wherein there is provided a memory for storing the information of a plurality of languages, and said report data transmitting step selects a language in said memory in accordance with the discrimination results at said discriminating steps and forms said report data in the selected language.

9. An image communication method for receiving image data from a relay requesting station and relay-transmitting said image data to another partner, and after completion of the relay-transmission, converting character information associated with the relay-transmission results into image data and transmitting said image data to said relay requesting station, comprising the steps of:
    discriminating a country where said relay requesting station is installed; and
    generating a report data associated with the relay-transmission results by using a language corresponding to the discriminated country where said relay requesting station is installed, and transmitting said report data as image data to said relay requesting station.

10. A data communication apparatus for receiving data from a relay requesting station and relay-transmitting said data to another partner, comprising:
    a first memory for storing information of relay requesting stations permitted to request a relay;
    a second memory for storing information of a plurality type of languages for forming a report data associated with relay transmission results;
    a control circuit for discriminating a local area where said relay requesting station is installed, in accordance with the information stored in said first memory, and forming said report data associated with said relay-transmission results by using a language corresponding to said discriminated local area; and
    a communication control unit for transmitting said report data to said relay requesting station.

11. A data communication apparatus according to claim 10, wherein the information of said first memory is related to a telephone number, and said control circuit discriminates a country where said relay requesting station is installed, in accordance with the telephone number in said first memory.

* * * * *

UNITED STATES PATENT AND TRADEMARK OFFICE
CERTIFICATE OF CORRECTION

PATENT NO. : 5,157,514
DATED : October 20, 1992
INVENTOR(S) : Kazuhiko Yoshioka

It is certified that error appears in the above-indentified patent and that said Letters Patent is hereby corrected as shown below:

Column 3, Line 2, "baem" should read --beam--.

Column 4, Line 58, "stationas." should read --stations.--

Column 5, Line 20, "the" should read --a--.
         Line 41, "the" should read --a--.
         Line 45, "the" should read --a--.

Column 6, Line 6, "the" should be deleted.
         Line 9, "the" should be deleted.

Signed and Sealed this

Fourteenth Day of December, 1993

Attest:

BRUCE LEHMAN

*Attesting Officer*      *Commissioner of Patents and Trademarks*